United States Patent
Caspi et al.

(10) Patent No.: US 10,552,727 B2
(45) Date of Patent: Feb. 4, 2020

(54) METHODS AND SYSTEMS FOR DATA TRAFFIC ANALYSIS

(71) Applicant: Deep Instinct Ltd., Tel Aviv (IL)

(72) Inventors: Guy Caspi, Tel Aviv (IL); Doron Cohen, Karkur (IL); Eli David, Holon (IL); Nadav Maman, Hod HaSharon (IL); Yoel Neeman, Ra'anana (IL); Ishai Rosenberg, Rosh Ha'a'yin (IL)

(73) Assignee: DEEP INSTINCT LTD., Tel Aviv (IL)

( * ) Notice: Subject to any disclaimer, the term of this patent is extended or adjusted under 35 U.S.C. 154(b) by 874 days.

(21) Appl. No.: 14/969,080

(22) Filed: Dec. 15, 2015

(65) Prior Publication Data

US 2017/0169357 A1 Jun. 15, 2017

(51) Int. Cl.
*G06N 3/04* (2006.01)
*G06N 20/00* (2019.01)
(Continued)

(52) U.S. Cl.
CPC ........... *G06N 3/0445* (2013.01); *G06N 20/00* (2019.01); *H04B 1/3822* (2013.01); *H04L 41/22* (2013.01); *H04L 43/045* (2013.01); *H04L 43/062* (2013.01)

(58) Field of Classification Search
CPC .... G06N 99/005; G06N 3/0445; G06N 3/084; G06N 20/00; G06N 3/04; H04B 1/3822; H04L 41/22; H04L 43/045; H04L 43/062
See application file for complete search history.

(56) References Cited

U.S. PATENT DOCUMENTS 7,152,051 B1 * 12/2006 Commons ................ G06N 3/08
706/16
8,306,931 B1 11/2012 Bowman et al.
(Continued)

FOREIGN PATENT DOCUMENTS

WO 2015/001544 1/2015

OTHER PUBLICATIONS

Viola, Paul et al.; Fast and Robust Classification using Asymmetric AdaBoost and a Detector Cascade; 2001; Mistubishi Electric Research Lab; 8 pages. (Year: 2001).*
(Continued)

*Primary Examiner* — Stanley K. Hill
(74) *Attorney, Agent, or Firm* — Browdy and Neimark, P.L.L.C.

(57) ABSTRACT

A method of analyzing data exchange of at least one device includes feeding a plurality of data exchanged by the at least one device to a system for data exchange analysis that includes a deep learning algorithm. The deep learning algorithm includes at least an input layer, an output layer of the same size as the input layer, and hidden layers. Neurons of the hidden layers receive recurrently, at each time t, only a subset of the data exchanged by the at least one device up to time t, the subset of data comprising current data from time t and only a fraction of past data from time $t_{past}$ to time t, with $t_{past}$<t. The method includes attempting to reconstruct, at the output layer, at each time t, data received at the input layer. The reconstructed data is compared with at least part of the plurality of data. In indication is provided on one or more anomalies in the data, based on at least the comparison.

28 Claims, 6 Drawing Sheets

(51) Int. Cl.
*H04B 1/3822* (2015.01)
*H04L 12/24* (2006.01)
*H04L 12/26* (2006.01)

(56) References Cited

U.S. PATENT DOCUMENTS

| | | | |
|---|---|---|---|
| 9,378,079 B2 | 6/2016 | Ivanova et al. | |
| 9,401,020 B1 | 7/2016 | Li et al. | |
| 9,595,191 B1* | 3/2017 | Surpi | G08G 1/052 |
| 9,852,019 B2* | 12/2017 | Ashani | G06F 11/0706 |
| 2006/0106530 A1* | 5/2006 | Horvitz | G08G 1/0104 |
| | | | 701/117 |
| 2014/0114556 A1* | 4/2014 | Pan | G08G 1/00 |
| | | | 701/119 |
| 2014/0201126 A1 | 7/2014 | Zadeh et al. | |

OTHER PUBLICATIONS

Cavalcanti, George D. C. et al.; MLPBOOST: A Combined Adaboost / Multi-Layer Perceptron Network Approach for Face Detection; 2102 IEEE International Conference on Systems, Man, and Cybernetics; pp. 2350-2353. (Year: 2012).*
Kaynak, Cenki et al.; MultiStage Cascading of Multiple Classifiers: One Man's Noise is Another Man's Data; 2000 Bogazici University; 8 pages. (Year: 2000).*
Deng, L. et al "Deep Learning: Methods and Applications" Foundations and Trends in Signal Processing 7: 3-4 (2014).
Bengio, Yoshua "Learning Deep Architectures for AI", Foundations and Trends in Machine Learning 2 (1):1-127 (2009).
Yann Lecun et al "Deep Learning" Nature 521, 436-444, (May 28, 2015).
Wikipedia, https://en.wikipedia.org/wiki/Deep_learning (Sep. 16, 2015).
Vincent P. et al. "Stacked Denoising Autoencoders: Learning Useful Representations in a Deep Network with Local Denoising Criterion", , Journal of Machine Learning Research 11 :3371-340 (2010).
Larochelle et al "Classification using discriminative restricted Boltzmann machines" Proceedings of the 25th International conference on Machine learning, ICML '08, p. 536 (2008).
Hinton et al "A Fast Learning Algorithm for Deep Belief Nets", Neural Computation 18, 1527-1554 (2006).
Wikipedia, https://en.wikipedia.org/wiki/Restricted_Boltzmann_machine (Aug. 6, 2015).
Werbos, P et al "Beyond Regression: New Tools for Prediction and Analysis in the Behavioral Sciences" PhD thesis, Harvard Univ. 1-454 (Aug. 1974).
Parker, D. B. "Learning-Logic: Casting the Cortex of the Human Brain in Silicon" Report TR-47 MIT Press, (Feb. 1985).
Rumelhart, D. E., et al "Learning representations by back-propagating errors", Nature 323, 533-536 (1986).
https://en.wikipedia.org/wiki/Backpropagation (Sep. 16, 2015).
Davis, et al https://www.blackhat.com/docs/us-15/materials/us-15-Davis-Deep-Learning-On-Disassembly.pdf.
http://www.darkreading.com/vulnerabilities-threats/researchers-enlist-machine-learning-in-malware-detection/d/id-d/1321423.
Werbos "Backpropagation Through Time: What It Does and How to Do It", Proceedings of the IEEE, vol. 78, No. 10, (Oct. 1990).

* cited by examiner

METHODS AND SYSTEMS FOR DATA TRAFFIC ANALYSIS

TECHNICAL FIELD

The presently disclosed subject matter relates to the field of data traffic analysis.

BACKGROUND

In various devices, data are exchanged, such as electronic data representing physical quantities.

The data may for instance be exchanged between units of the device, and/or with units of external devices. The data may be also computed and stored in the device.

The exchange of data in a device is generally known in the art as "data traffic".

The data may further be processed, for instance by a processing unit.

The processing of these data by the processing unit may comprise an analysis of these data, for instance to detect anomalies in these data, thus being able to raise an alert.

The general tendency is to increase the number and the size of the data which are exchanged.

Huge amounts of data, which may in addition vary in time, may thus be exchanged.

The analysis of these data, in order to detect anomalies, thus becomes cumbersome.

Accordingly there is a need in the art to provide new systems and methods for data traffic analysis.

GENERAL DESCRIPTION

In accordance with certain aspects of the presently disclosed subject matter, there is provided a method for training a system for analysis of data traffic of a device, the system including at least a deep learning algorithm operable on at least a processing unit, the method comprising feeding a training set of data to the system for data traffic analysis, attempting to reconstruct at least part of the training set of data with the deep learning algorithm, the reconstruction taking into account past data of the training set, and based on at least this attempted reconstruction, updating a model of the deep learning algorithm, for allowing the system for data traffic analysis to detect anomalies in the data of the device.

According to some embodiments, the processing unit comprises at least a graphical processing unit. According to some embodiments, the training is performed while the device is used, and/or before the device is being used. According to some embodiments, the device is a car. According to some embodiments, the deep learning algorithm comprises a recurrent neural network which comprises at least an input layer and an output layer, and wherein the reconstruction comprises attempting to reconstruct data fed to the input layer at the output layer. According to some embodiments, the deep learning algorithm comprises hidden layers in which (at least part of the) neurons receive past data (for instance they receive at time t data from time t−1) and the reconstruction comprises attempting to reconstruct data fed to the input layer at the output layer. According to some embodiments, the deep learning algorithm comprises hidden layers in which (at least part of the) neurons receive current data (such as data from time t) and past data (such as data from time t−1) and the reconstruction comprises attempting to reconstruct data fed to the input layer at the output layer.

In accordance with some aspects of the presently disclosed subject matter, there is provided a method for training a system for analysis of data traffic of a device, the system including at least a deep learning algorithm operable on at least a processing unit, the method comprising feeding a training set of data to the system for traffic analysis, attempting to reconstruct at least part of the training set of data with the deep learning algorithm, wherein the deep learning algorithm is operated on at least a graphical processing unit, and based on at least this attempted reconstruction, updating a model of the deep learning algorithm, for allowing the system for data traffic analysis to detect anomalies in the data of the device.

According to some embodiments, the reconstruction takes into account past data of the training set. According to some embodiments, the training is performed while the device is being used, and/or before the device is being used. According to some embodiments, the device is a car. According to some embodiments, the deep learning algorithm comprises a recurrent neural network which comprises at least an input layer and an output layer, and wherein the reconstruction comprises attempting to reconstruct data fed to the input layer at the output layer. According to some embodiments, the deep learning algorithm comprises hidden layers in which (at least part of the) neurons receive past data (for instance they receive at time t data from time t−1) and the reconstruction comprises attempting to reconstruct data fed to the input layer at the output layer. According to some embodiments, the deep learning algorithm comprises hidden layers in which (at least part of the) neurons receive current data (such as data from time t) and past data (such as data from time t−1) and the reconstruction comprises attempting to reconstruct data fed to the input layer at the output layer.

In accordance with some aspects of the presently disclosed subject matter, there is provided a method for analyzing data traffic of a device with a system for data traffic analysis, the system for traffic analysis comprising at least a deep learning algorithm operable on at least a processing unit, the method comprising feeding a plurality of data exchanged in the device to the system for data traffic analysis, attempting to reconstruct at least part of said plurality of data with the deep learning algorithm, the reconstruction taking into account past exchanged data, comparing the reconstructed data with at least part of said plurality of data, and providing indications on anomalies in the data, based on at least said comparison. According to some embodiments, the processing unit comprises at least a graphical processing unit. According to some embodiments, the deep learning algorithm is trained while a user is using the device, and/or is trained before the user is using the device. According to some embodiments, the device is a car. According to some embodiments, the deep learning algorithm comprises a recurrent neural network which comprises at least an input layer and an output layer, and wherein the reconstruction comprises attempting to reconstruct data fed to the input layer at the output layer. According to some embodiments, the deep learning algorithm comprises hidden layers in which (at least part of the) neurons receive past data (for instance they receive at time t data from time t−1) and the reconstruction comprises attempting to reconstruct data fed to the input layer at the output layer. According to some embodiments, the deep learning algorithm comprises hidden layers in which (at least part of the) neurons receive current data (such as data from time t) and past data (such as data from time t−1) and the reconstruction comprises attempting to reconstruct data fed to the input layer at the output layer.

In accordance with some aspects of the presently disclosed subject matter, there is provided a method for analyzing data traffic of a device with a system for data traffic analysis, the system for traffic analysis comprising at least a deep learning algorithm operable on at least a processing unit, the method comprising feeding a plurality of data exchanged in the device to the system for traffic analysis, attempting to reconstruct at least part of said plurality of data with the deep learning algorithm, wherein the deep learning algorithm is operated on a graphical processing unit, comparing the reconstructed data with at least part of said plurality of data, and providing indications on anomalies in the data, based on at least said comparison.

According to some embodiments, the reconstruction takes into account past exchanged data. According to some embodiments, the deep learning algorithm is trained is trained while the device is used and/or before the device is used. According to some embodiments, the device is a car. According to some embodiments, the deep learning algorithm comprises a recurrent neural network which comprises at least an input layer and an output layer, and wherein the reconstruction comprises attempting to reconstruct data fed to the input layer at the output layer. According to some embodiments, the deep learning algorithm comprises hidden layers in which (at least part of the) neurons receive past data (for instance they receive at time t data from time t−1) and the reconstruction comprises attempting to reconstruct data fed to the input layer at the output layer. According to some embodiments, the deep learning algorithm comprises hidden layers in which (at least part of the) neurons receive current data (such as data from time t) and past data (such as data from time t−1) and the reconstruction comprises attempting to reconstruct data fed to the input layer at the output layer.

In accordance with some aspects of the presently disclosed subject matter, there is provided a system for analyzing data traffic of a device, the system comprising at least a processing unit, at least a deep learning algorithm operable on said processing unit, the system being configured to receive a plurality of data of the device, attempt to reconstruct at least part of the plurality of data with the deep learning algorithm, the reconstruction taking into account past data, compare the reconstructed data with at least part of the plurality of data, and provide indications on anomalies in the data, based on at least said comparison.

According to some embodiments, the processing unit comprises at least a graphical processing unit. According to some embodiments, the deep learning algorithm is trained while the device is used and/or before the device is used. According to some embodiments, the device is a car. According to some embodiments, the deep learning algorithm comprises a recurrent neural network which comprises at least an input layer and an output layer, and wherein the reconstruction comprises attempting to reconstruct data fed to the input layer at the output layer. According to some embodiments, the deep learning algorithm comprises hidden layers in which (at least part of the) neurons receive past data (for instance they receive at time t data from time t−1) and the reconstruction comprises attempting to reconstruct data fed to the input layer at the output layer. According to some embodiments, the deep learning algorithm comprises hidden layers in which (at least part of the) neurons receive current data (such as data from time t) and past data (such as data from time t−1) and the reconstruction comprises attempting to reconstruct data fed to the input layer at the output layer.

In accordance with some aspects of the presently disclosed subject matter, there is provided a system for analyzing data traffic of a device, the system comprising at least a graphical processing unit, at least a deep learning algorithm operable on said graphical processing unit, the system being configured to receive a plurality of data of the device, attempt to reconstruct at least part of the plurality of data with the deep learning algorithm, compare the reconstructed data with at least part of the plurality of data, and provide indications on anomalies in the data, based on at least said comparison.

According to some embodiments, the reconstruction takes into account past exchanged data. According to some embodiments, the deep learning algorithm is trained while the device is used and/or before the device is used. According to some embodiments, the device is a car. According to some embodiments, the deep learning algorithm comprises a recurrent neural network which comprises at least an input layer and an output layer, and wherein the reconstruction comprises attempting to reconstruct data fed to the input layer at the output layer. According to some embodiments, the deep learning algorithm comprises hidden layers in which (at least part of the) neurons receive past data (for instance they receive at time t data from time t−1) and the reconstruction comprises attempting to reconstruct data fed to the input layer at the output layer. According to some embodiments, the deep learning algorithm comprises hidden layers in which (at least part of the) neurons receive current data (such as data from time t) and past data (such as data from time t−1) and the reconstruction comprises attempting to reconstruct data fed to the input layer at the output layer.

In accordance with some aspects of the presently disclosed subject matter, there is provided a training module, for training a system for analyzing data traffic of a device, the system for traffic analysis comprising at least a deep learning algorithm, the training module being configured to feed a training set of data to the system for traffic analysis, cause the system for data traffic analysis to attempt to reconstruct at least part of the training set of data with the deep learning algorithm, wherein the deep learning algorithm is operated on at least a graphical processing unit, and based on this reconstruction, update a model of the deep learning algorithm, for allowing the system for data traffic analysis to detect anomalies in the data of the device.

According to some embodiments, the reconstruction takes into account past exchanged data.

In accordance with some aspects of the presently disclosed subject matter, there is provided a non-transitory storage device readable by a machine, tangibly embodying a program of instructions executable by the machine to perform a method for training a system for analysis of data traffic of a device, the system including at least a deep learning algorithm operable on at least a processing unit, the method comprising feeding a training set of data to the system for data traffic analysis, attempting to reconstruct at least part of the training set of data with the deep learning algorithm, the reconstruction taking into account past data of the training set, and based on at least this attempted reconstruction, updating a model of the deep learning algorithm, for allowing the system for data traffic analysis to detect anomalies in the data of the device.

In accordance with some aspects of the presently disclosed subject matter, there is provided a non-transitory storage device readable by a machine, tangibly embodying a program of instructions executable by the machine to perform a method for analyzing data traffic of a device with a system for data traffic analysis, the system for traffic analysis comprising at least a deep learning algorithm operable on at least a processing unit, the method comprising feeding a plurality of data exchanged in the device to the system for data traffic analysis, attempting to reconstruct at least part of said plurality of data with the deep learning algorithm, the reconstruction taking into account past exchanged data, comparing the reconstructed data with at least part of said plurality of data, and providing indications on anomalies in the data, based on at least said comparison.

According to certain embodiments of the invention, a training of a system for data traffic analysis is performed, said training taking into account the time history of said data.

According to certain embodiments of the invention, a large amount of data is used to train a system for data traffic analysis, the training being performed in a short period of time.

According to certain embodiments of the invention, a large amount of data is used to train a system for data traffic analysis, the training being performed continuously on a device.

According to certain embodiments of the invention, a large amount of data traffic of a device is analyzed in a short period of time, in order to detect anomalies.

According to certain embodiments of the invention, the analysis of data traffic of a device is performed up to a hundred times faster than some prior art solutions (this value being non limitative).

According to certain embodiments of the invention, data traffic of a device is analyzed, said analysis taking into account the time history of said data.

According to certain embodiments of the invention, both a training of a system for data traffic analysis based on real data traffic of a device, and analysis of said data by the system for data traffic analysis are simultaneously performed. In particular, according to some embodiments, the training with live data may be performed simultaneously with the analysis of said data even when a large amount of data is exchanged in the device.

BRIEF DESCRIPTION OF THE DRAWINGS

In order to understand the invention and to see how it can be carried out in practice, embodiments will be described, by way of non-limiting examples, with reference to the accompanying drawings, in which.

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods have not been described in detail so as not to obscure the presently disclosed subject matter.

Unless specifically stated otherwise, as apparent from the following discussions, it is appreciated that throughout the specification discussions utilizing terms such as "feeding", "reconstructing", "replicating", "updating", "comparing", "providing", or the like, refer to the action(s) and/or process(es) of a processor that manipulate and/or transform data into other data, said data represented as physical, such as electronic, quantities and/or said data representing the physical objects.

The term "processing unit" covers any computing unit or electronic unit that may perform tasks based on instructions stored in a memory, such as a computer, a server, a chip, etc. It encompasses a single processor or multiple processors, which may be located in the same geographical zone or may, at least partially, be located in different zones and may be able to communicate together.

Embodiments of the presently disclosed subject matter are not described with reference to any particular programming language. It will be appreciated that a variety of programming languages may be used to implement the teachings of the presently disclosed subject matter as described herein.

Figure 1:
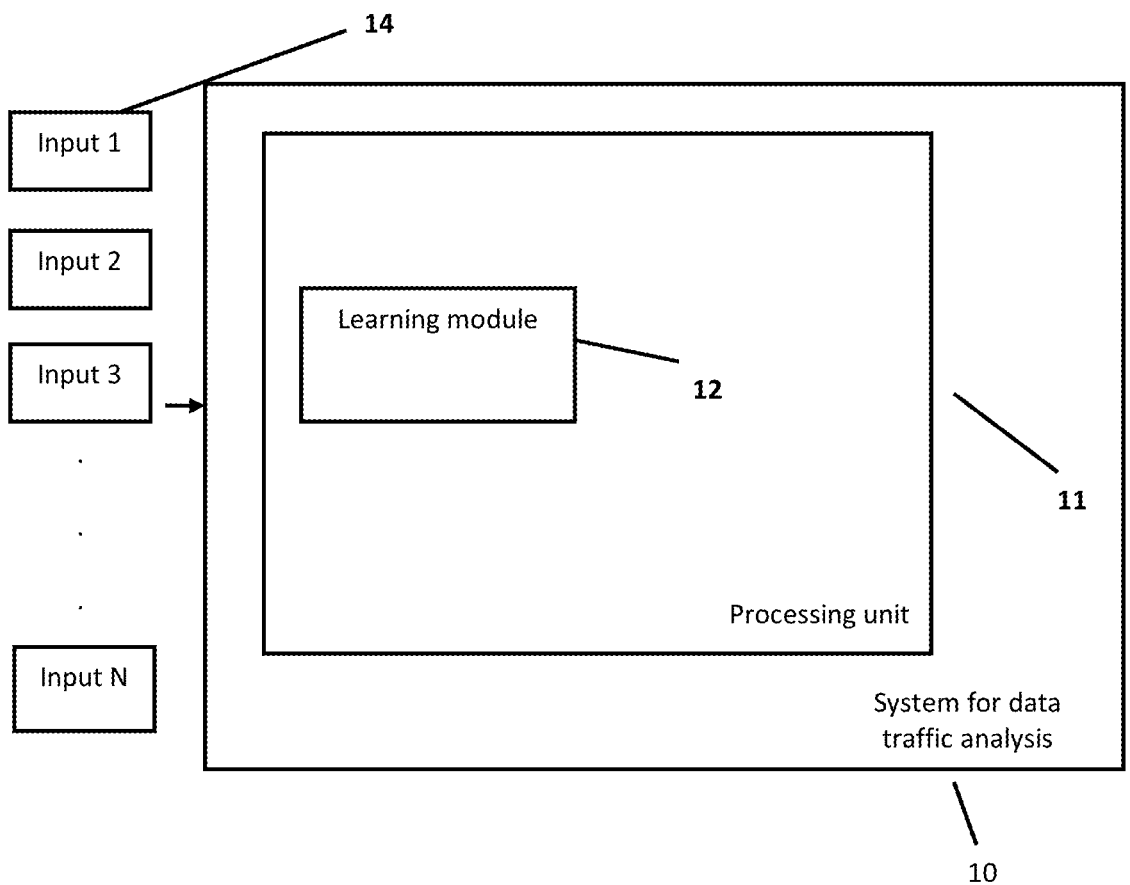
FIG. 1 illustrates a possible embodiment of a system for analyzing data traffic.

FIG. 1 describes a possible embodiment of a system 10 for analyzing data traffic of a device. The system 10 comprises at least a processing unit 11.

According to some embodiments, the processing unit 11 may comprise at least a CPU.

According to some embodiments, the processing unit 11 may comprise at least a graphical processing unit (GPU). A graphical processing unit generally comprises a specialized electronic circuit designed to rapidly manipulate and alter memory to accelerate the creation of images in a frame buffer intended for output to a display. A graphical processing unit generally comprises highly parallel structures, contrary to standard CPUs.

According to some embodiments, all the components of the system 10 are operable on at least a graphical processing unit.

The system 10 further comprises at least a learning module 12. The learning module 12 may comprise a neural network algorithm, which is operable on the processing unit 11.

According to some embodiments, the learning module 12 comprises at least a deep learning algorithm (also called deep neural network).

A deep learning algorithm differs notably from a standard neural network algorithm in that it may comprise a plurality of hidden layers, whereas the standard neural network algorithm generally comprises a single hidden layer.

As illustrated in FIG. 1, the system 10 is configured to receive a plurality of data 14: Input 1, Input 2, ..., Input N.

Figure 2:
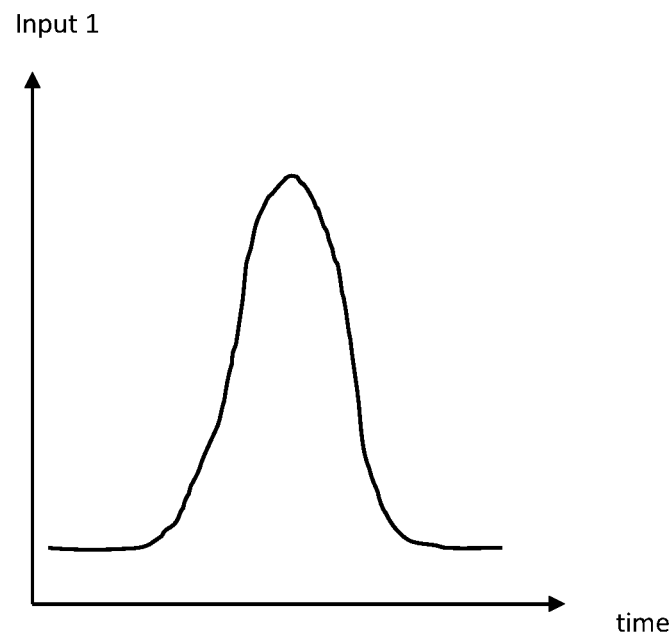
FIG. 2 illustrates a curve which plots the evolution of an input data to the system for data traffic analysis with respect to time.

As shown in FIG. 2 for Input 1, each input may vary in time, which means that the system may receive various values for each input, wherein each value corresponds to the value of the input at a different time.

The nature of the data depends on the device in which the data traffic occurs.

In a possible embodiment, the inputs are data exchanged in a plant, for example between various units of the plant, or data computed by each unit of the plant. This list is not limitative.

In another possible embodiment, the inputs are data of a car, such as vehicle speed, temperature in the vehicle, temperature of the motor, oil level, etc. This list is not limitative.

In another possible embodiment, the inputs are data exchanged in a server of a bank, such as trading orders, financial data, etc. This list is not limitative.

In another possible embodiment, the inputs are data exchanged between servers of a law firm.

Other types of data may be analyzed.

Data which may be fed to the system 10 may comprise data exchanged inside a device (such as inside the plant, or inside the car) and/or data exchanged by the device with other external devices (such as data received by the plant or the car from external devices or emitted by the plant or the car towards external devices), or data stored or computed in the device.

The system 10 may communicate with the device in which the data to be analyzed are exchanged, such as through any adapted communication network, or may be part of said device. A combination of these solutions may also be implemented.

For example, if the device is car, the system 10 may be embedded in the car. According to some other embodiments, the system 10 may be remotely located and may receive the data exchanged in the car through a communication network.

As explained further in the specification, the analysis of data exchanged in the device may provide indications on anomalies detected in the exchanged data.

Figure 3:
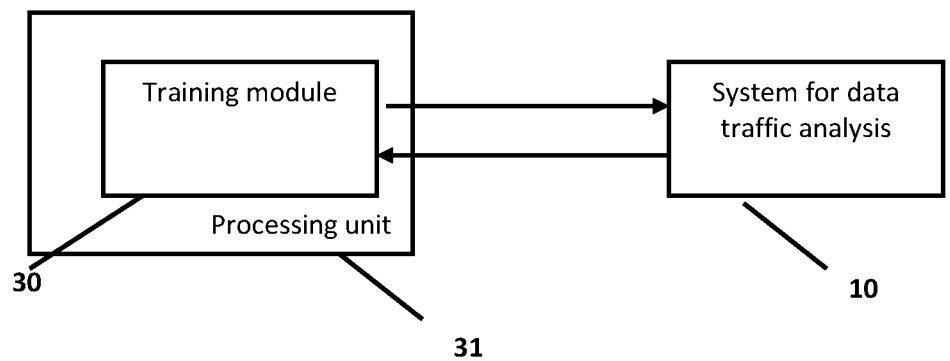
FIG. 3 illustrates an embodiment of a training module for training the system for data traffic analysis.

According to some embodiments, and as shown in FIG. 3, a training module 30 may be used to train the system 10 for data traffic analysis. The training module 30 may be operable on a processing unit 31. According to some embodiments, the training module 30 is operable on a graphical processing unit.

Although the training module 30 and the system 10 are represented as separate entities, it is to be understood that the training module may be integral to the system 10, or at least part of the training module 30 may be part of the system 10.

The training module 30 may be configured to feed at least a training set of data to the system 10 for data traffic analysis, in order to train a model of the deep learning algorithm.

Embodiments for these training methods will be described later in the specification, in particular with reference to FIGS. 4 and 6.

According to some embodiments, the system 10 is first trained before the device is being used ("offline" training), or while the device is not being used. For example, for a car, the system 10 is trained e.g. at the factory or in a laboratory before the car is used by a user. For example, the training is done for each car model of the car manufacturer. It is of course possible to further tune the training by performing different trainings depending on the profile of the user, or depending on other criteria that may influence the exchanged data.

The training set of data may represent real data that would be exchanged in the device when it is being used, for instance by a user. This kind of training is particularly useful when it is possible to obtain in advance a training set of data which closely represents the data that will be effectively exchanged when the device is used.

According to other embodiments, the system 10 is trained while the device is being used ("online" training). In this case, the training set of data comprises in fact real data (live data) that are exchanged in the device. This kind of training may be relevant when it is not possible to obtain in advance a training set of data which closely represents the real data that will be exchanged in the device. This kind of training may also be relevant when it is not desired to compute in advance a training set of data, and it is preferred to rely on real data that are exchanged in the device.

When the system 10 is trained while the device is being used, the data may be real and live data exchanged in the device. Thus, the data may be both used by the system 10 to detect anomalies, and also to improve its prediction model (which corresponds to the model used by the deep learning algorithm) as described in the various embodiments of the training methods (see e.g. FIGS. 4 to 9). After some time, the prediction model may be considered as trained (thus its parameters such as its coefficients may be fixed) and the data are used only for detecting anomalies.

For example, in an online training of a system for data traffic analysis of a car, it may be set in advance that after N driving sessions, the prediction model of the deep learning algorithm is considered as trained and the data are used for anomaly detection only. According to some embodiments, a continuous training is performed while the device is used.

According to some embodiments, the system 10 is both trained before the device is used and while the device is used, in order to further enhance training.

The training may allow notably training at least a model (also called network model, or prediction model) of the deep learning algorithm, in order to allow the system 10 to perform analysis of the data of the device, and thus detect anomalies in the data of the device.

An embodiment for training a system for data traffic analysis will now be described.

Figure 4:
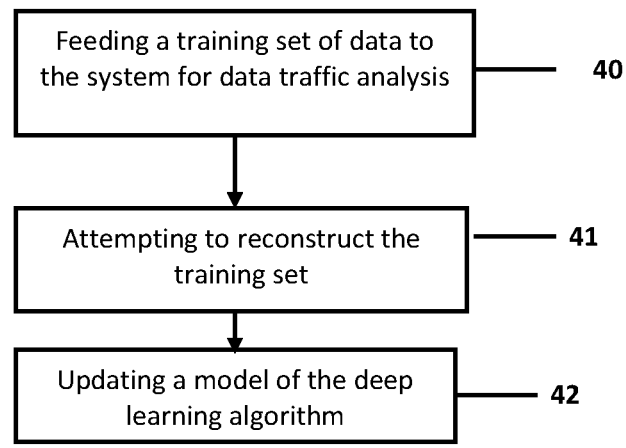
FIG. 4 illustrates an embodiment of a method for training the system for data traffic analysis.

As shown in FIG. 4, the training method may comprise a step 40 of feeding a training set of data to the system for traffic analysis.

As mentioned, if the system 10 is trained before the device is being used, the training set of data may comprise data which represent real data that would be exchanged in the device.

This training set of data may be obtained by simulation and/or may correspond to data that were measured and collected in a device in at least a prior use of the device. For instance, if the device is a car, the training set of data may be based on data that were collected while a user was driving the car. Of course, this applies to various other devices for which data are to be analyzed, such as units of a plant, servers in a firm, etc.

If the system 10 is trained while the device is being used, the training set of data may comprise data that are currently exchanged or present in the device. The system 10 may receive the data from various parts of the device. For instance, in a car, the system 10 may receive data from various units of the car (navigation system, motor, sensors, etc., this list being not limitative).

As also illustrated in FIG. 4, the training method may comprise attempting to reconstruct at least part of the training set of data with the deep learning algorithm (step 41).

In particular, the deep learning algorithm comprises at least a model which receives the training set of data and tries to reconstruct the training set of data at the output of the deep learning algorithm.

According to some embodiments, the deep learning algorithm is operated on at least a graphical processing unit.

The use of a graphical processing unit improves performances and time needed for performing the training method, with respect to standard CPUs.

In particular, if the training method is performed while the device is used ("online" training), the use of a graphical processing unit may allow a processing time which is compatible with the fact that the data need to be simultaneously analyzed.

Even if the training method is performed while the device is not used ("offline" training), the use of a graphical processing unit improves the processing time for the training with respect to standard CPUs.

The training method may comprise a step 42 of updating a model of the deep learning algorithm, based on this attempted reconstruction. The training affects the weights (also called synapses) connecting the neurons (which are the different units of a layer). The model is thus trained in order to make it able to reconstruct the training set of data that is fed to the deep learning algorithm. Examples of training methods which allow the update of the model of the deep learning algorithm will be provided in the specification.

As explained with reference to FIGS. 9 and 10, this training phase may allow the system for data traffic analysis to detect anomalies in the data of the device.

Figure 5:
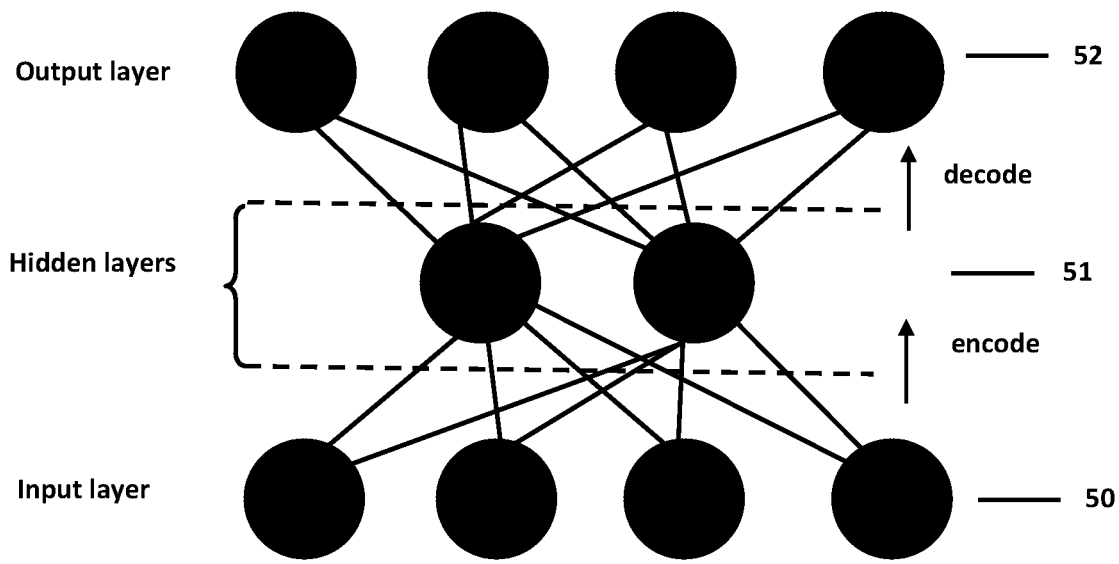
FIG. 5 illustrates an embodiment of a network model that may be used in a learning module of the system.

FIG. 5 illustrates a possible model that can be used for the deep learning algorithm of the system 10, based on an auto-encoder.

FIG. 5 illustrates a simplified structure of an auto-encoder, which comprises an input layer 50 and an output layer 51. Auto-encoders (AE) are feed-forward neural networks in which the output layer 52 has the same size as the input layer 50. In this model, the model attempts to reconstruct, at its output layer, the data which are fed at its input layer. The model may further comprise hidden layers 51 (for the sake of conciseness of the figure, only one hidden layer was represented). If the model comprises a single hidden layer, it may be viewed as a neural network algorithm.

There are many variations of auto-encoders, such as, but not limited to, basic auto-encoder, denoising auto-encoder, deep stacked auto-encoder which is trained one layer at a time, restricted Boltzmann machine (RBM), etc.

Training methods of an auto-encoder are described e.g. in the article "*Stacked Denoising Autoencoders: Learning Useful Representations in a Deep Network with a Local Denoising Criterion*", Vincent P. et al., Journal of Machine Learning Research 11 (2010) 3371-3408, which is incorporated herein by reference.

A method for training an auto-encoder is called the backpropagation method. This method is for instance described in Werbos, P., Beyond Regression: New Tools for Prediction and Analysis in the Behavioral Sciences, PhD thesis, Harvard Univ. (1974), Parker, D. B. Learning Logic Report TR-47 (MIT Press, 1985), Rumelhart, D. E., Hinton, G. E. & Williams, R. J., Learning representations by back-propagating errors, Nature 323, 533-536 (1986), and in the webpage of Wikipedia: https://en.wikipedia.org/wiki/Back-propagation. These documents are all herein incorporated by reference.

Restricted Boltzmann machine may be trained using "contrastive divergence" method, which is for instance described in Hinton, G. E., Osindero, S. & Teh, Y.-W., A fast learning algorithm for deep belief nets, Neural Computation 18, 1527-1554 (2006). This document is herein incorporated by reference.

These training methods may be used to update the model of the deep learning algorithm of the system 10.

Another embodiment for training a system for data traffic analysis will now be described.

Figure 6:
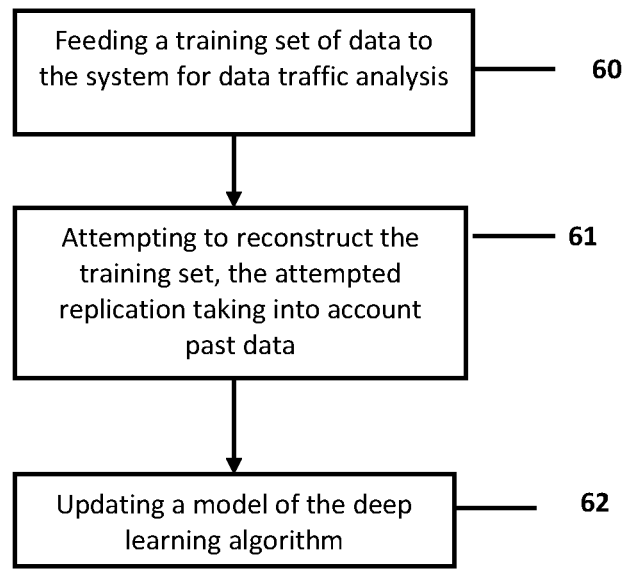
FIG. 6 illustrates another embodiment of a method for training the system for data traffic analysis, which takes into account the history of the exchanged data.

As shown in FIG. 6, the training method may comprise a step 60 of feeding a training set of data to the system for traffic analysis. This step is similar to that described with reference to step 40 of FIG. 4.

As already mentioned, the deep learning algorithm of the system may be operated on at least a graphical processing unit.

As also illustrated in FIG. 6, the training method may comprise attempting to reconstruct at least part of the training set of data with the deep learning algorithm (step 61).

According to some embodiments, the attempted reconstruction takes into account past data of the training set.

Indeed, as mentioned, each data of the training set may vary in time. For instance, in a car, speed vehicle varies with time, temperature of the motor varies in time, etc.

In other words, when the model tries to reconstruct data that are fed at time t to the system 10, it takes into account the current value of the input at time t and also the previous values of the data in an interval $[t_1; t]$, with $t1<t$. If the system 10 is fed with many inputs, the system 10 may take into account past data for each of the inputs.

A possible embodiment for this model will be described with reference to FIG. 8.

Taking into account previous values of the data is useful to improve the pertinence of the model of the deep learning algorithm.

Indeed, as mentioned, the system 10 is generally used to detect anomalies in the exchanged data. Taking into account the history of the data improves the performance of anomaly detection.

Figure 7:
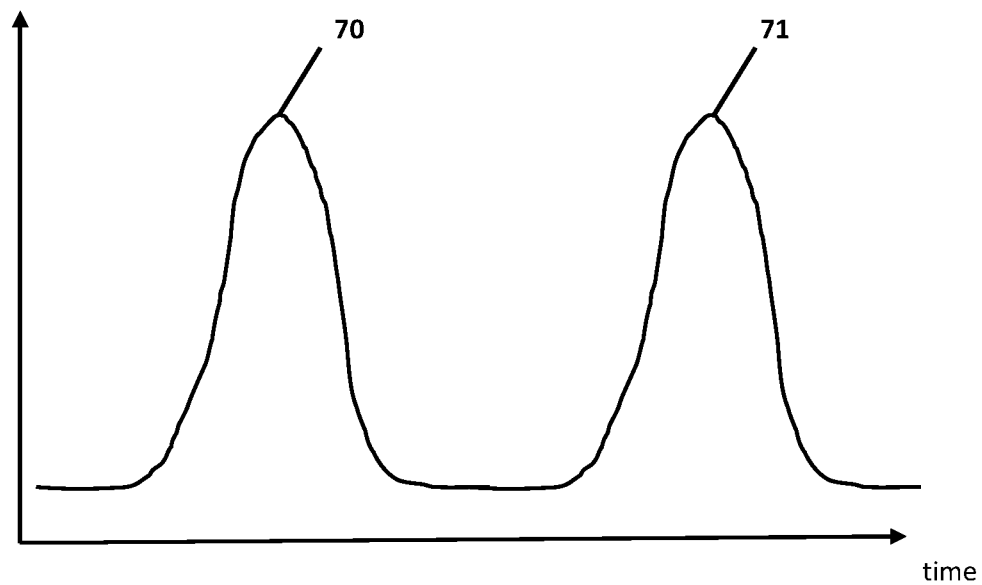
FIG. 7 illustrates a curve which plots the evolution of an input data to the system for data traffic analysis with respect to time.

FIG. 7 illustrates a temporal curve for an input (Input 1) of the training set of data. When the system 10 receives Input 1, the first peak 70 may appear as an anomaly. However, if the system 10 takes into account the time history of said input, it follows that this peak appears again (second peak 71). Thus, this peak may be considered as a normal peak in this input.

The training method may further comprise a step 62 of updating a model of the deep learning algorithm, based on this reconstruction.

This update may comprise updating coefficients (also called weights or synapses) of the model.

For instance, after it was attempted to reconstruct the input (in forward iteration, where the flow in the network is from input to output), then an update may be performed (in backward iteration, having calculated the errors at output, the gradients of these errors may be propagated backwards from output layer to input layer, and the weights may be updated).

The model is thus trained in order to make it able to reconstruct the training set of data that is fed to the deep learning algorithm. As mentioned, the model may be configured to take into account current data and past data.

Figure 8:
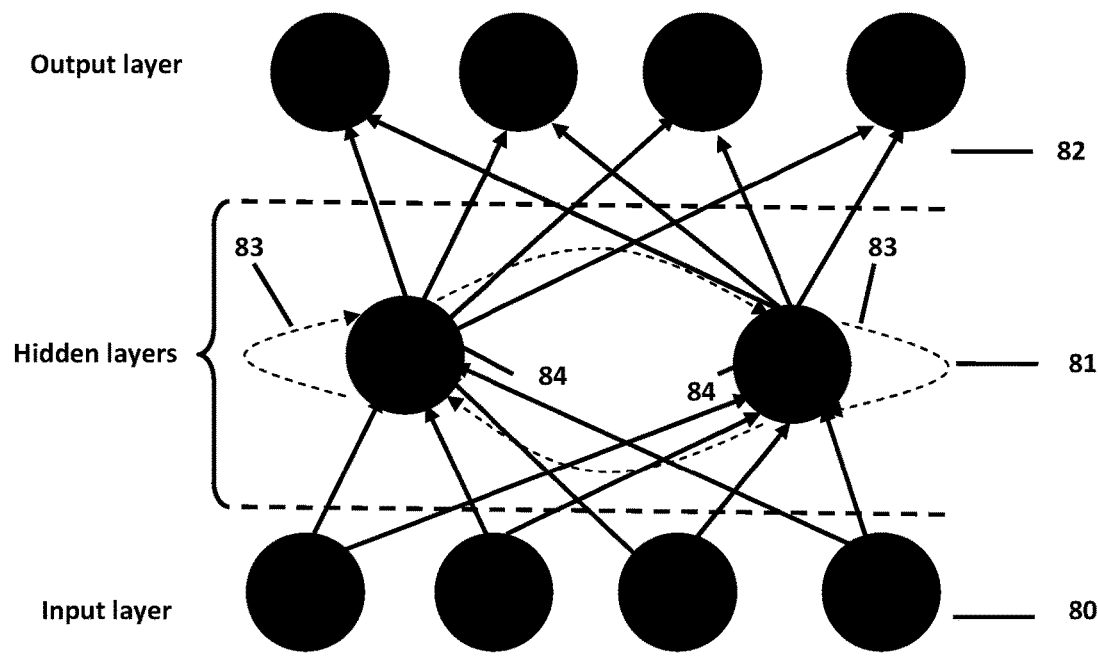
FIG. 8 illustrates another embodiment of a network model that may be used in a learning module of the system.

FIG. 8 illustrates a possible embodiment for a network model that can be used for the deep learning algorithm.

The representation of FIG. 8 is a simplified illustration of this model.

The structure of this network model may be viewed as a modified Recurrent Neural Network (RNN).

As shown, the structure may comprise at least an input layer 80, a plurality of hidden layers 81 (for the sake of conciseness of the figure, only one hidden layer was represented), and at least an output layer 82. If a single hidden layer is used, the model can be viewed as a neural network algorithm.

Recurrent Neural Networks may be described as feedforward neural networks in which the hidden units (hidden units 84, also called neurons, of the hidden layer 81) are connected to themselves (arrows 83). As illustrated, each layer comprises neurons, which may be connected together.

The hidden units 84 may receive at time t their own inputs e.g. from time t−1. According to some embodiments, they may receive current data (from time t) and past data (before time t, e.g. time t−1).

There are several types of RNN, e.g., standard RNN, deep RNN (with many hidden layers), LSTM, etc.

Recurrent neural networks may be trained using a variation of a backpropagation algorithm (which is used for training standard feedforward neural networks). This variation is called "backpropagation through time", and is described e.g. in the article "*Backpropagation Through Time: What It Does and How to Do It*", Werbos P., Proceedings of the IEEE, Vol. 78, No. 10, October 1990, which is incorporated herein by reference.

The training may affect the weights (also called synapses) connecting the neurons (which are the different units of a layer). In Recurrent Neural Networks, the training may affect also the recurrent weights, which are the weights connecting neurons in the same hidden layer.

In the modified Recurrent Neural Network of FIG. 8, the output layer 82 is of the same size as the input layer 80, so as to allow a reconstruction of the data fed to the input layer at the output layer.

Since the hidden units (hidden neurons) of the hidden layers are connected to themselves, the modified Recurrent Neural Network of FIG. 8 takes into account the past history of the data.

It is to be noted that the modified Recurrent Neural Network, for which the output layer is configured to recreate the input layer, can be based on various types of Recurrent Neural Networks, such as standard RNN, deep RNN (with many hidden layers), LSTM, or other variants etc. This list is not limitative.

During training time, each time an input data from time t is provided to the modified Recurrent Neural Network, it tries to reconstruct the data (passing through one or more smaller hidden layers which function as generalizing bottlenecks). The recurrent weights allow it to take history into consideration when reconstructing the input.

The training of a neural network generally comprises giving to the network expected output target labels which it should learn. For example, if the output should be an object in computer vision, the neuron associated with the correct object is expected to be 1 and the others 0.

According to some embodiments, the target labels of the neurons in the output layer of the modified Recurrent Neural Network are set to be the same as the inputs. For example, in a simple neural network with four input neurons and four output neurons, if for an input sample the data is 1, 2, 3, 4, then the target labels for the four output neurons may be set to be 1, 2, 3, 4. Given N neurons in output layer, for each input sample the expected N output targets may be assigned. The neural network tries to produce these results, which is also called the learning goal.

The training algorithm of the modified Recurrent Neural Network of FIG. 8 may rely on the backpropagation through time algorithm. As explained, the target labels for this algorithm may be defined as target labels which recreate the input data.

The modified Recurrent Neural Network of FIG. 8 can operate in an unsupervised context.

Other prediction models can be used in the learning module 12, such as an Auto-Encoder network (or any variant of Auto-Encoder) for which each previous output of each neuron (of the hidden layers) at time t−1 is stored as well (this modified AE network is not represented). A database may be used for storing this output at time t−1.

For example, if it is assumed that neuron X receives an input from neuron Y in a lower layer, and from neuron Z in its own hidden layer (i.e. recurrent connection), neuron Y will fire its current output, while neuron Z will fire its previous output (time t−1) into neuron X. As a consequence, the reconstruction of the data takes into account past data.

If an Auto-Encoder network is used, a backpropagation algorithm (already cited) may be used to train the Auto-Encoder network.

Figure 9:
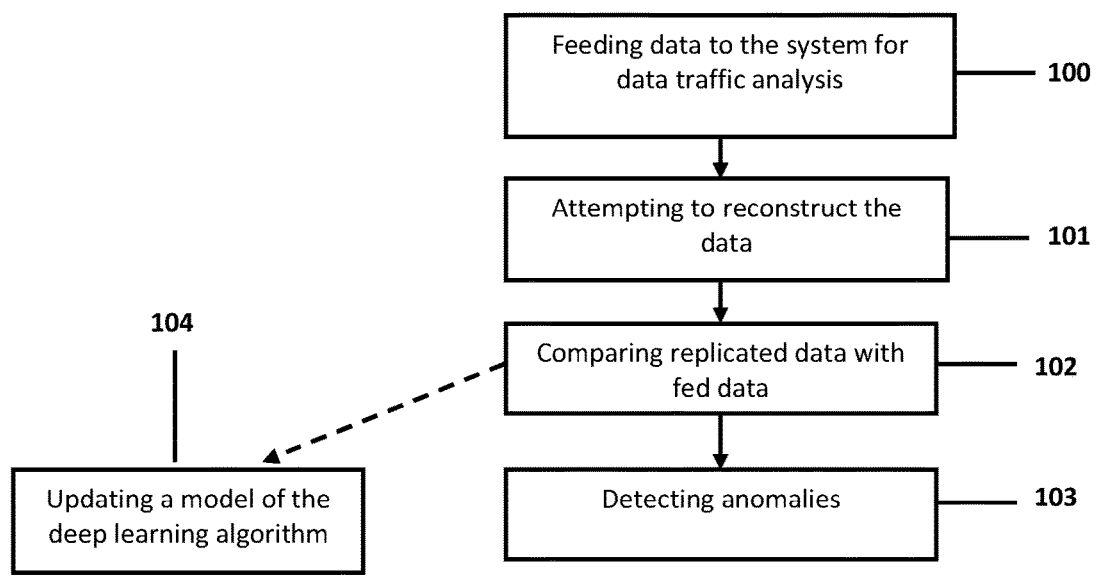
FIG. 9 illustrates an embodiment of a method for analyzing data traffic, said data being exchanged in at least a device.
Figure 10:
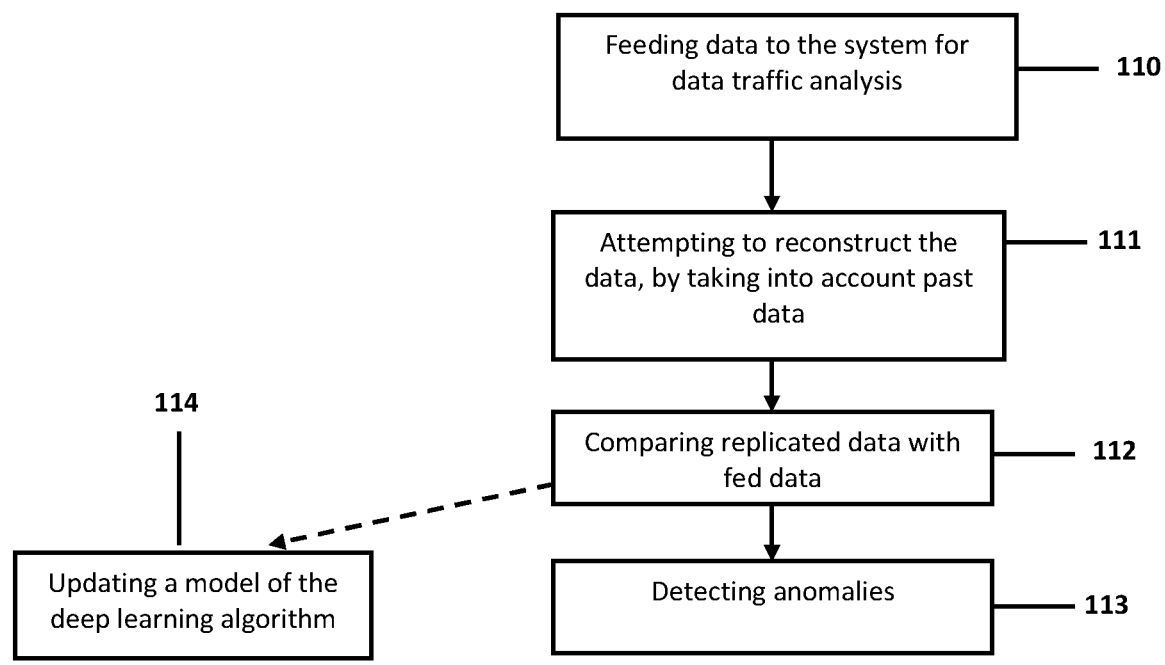
FIG. 10 illustrates an embodiment of a method for analyzing data traffic, which takes into account past exchanged data.

Turning now to FIG. 9, an embodiment of a method for analyzing data traffic is described, said data being exchanged and/or stored in at least a device.

The method may comprise a step 100 of feeding a plurality of data of the device to the system 10 for traffic analysis.

For example, in a car, the system 10 may be connected to a central processing unit of the car, and/or to various units of the car, in order to receive the data. The communication of data to the system 10 may be performed by any communication network, which uses wire communication and/or a wireless network.

The method may further comprise a step 101 of attempting to reconstruct the exchanged data. As already mentioned, the system 10 may comprise a learning module which comprises a deep learning algorithm which is configured to attempt to reconstruct the exchanged data received at its input, based on its prediction model. Thus, for each input i, an output unit i tries to reconstruct the corresponding input i. According to some embodiments, it is attempted to reconstruct only part of the data received by the system.

According to some embodiments, the prediction model is trained before ("offline" training) the device is used.

According to some embodiments ("online" training), the system 10 tries to both reconstruct the exchanged data, and to train its prediction model according to one of the various training methods described above, while the device is being used. As illustrated in FIG. 10, both a training step 104 and a prediction step 103 may be performed based on the data. Online training is also illustrated in FIG. 11, wherein both a training step 114 and a prediction step 113 may be performed based on the exchanged data.

In the case of online training, anomalies may be better detected after a certain period of time until the prediction model is trained.

According to some embodiments, the deep learning algorithm is operated on a graphical processing unit. The use of a graphical processing unit is useful to improve the speed and the capability of the system 10 to detect anomalies in the exchanged data, in particular when a large amount of data is used. According to some embodiments, when an offline training is performed, the anomaly detection performed on the graphical processing unit may be up to hundred times faster than prior art solutions (this number being not limitative).

In addition, the use of a graphical processing unit may allow the system 10 to perform at the same time a training of its prediction model and to be able to detect anomalies in the exchanged data in an acceptable timeframe, even with a large amount of data.

According to some embodiments, the attempt to reconstruct the data takes into account past data. This step is illustrated as step 112 in FIG. 10 (in FIG. 10, steps 110, 112, and 113 are similar to steps 100, 102 and 103 of FIG. 9). In the embodiment of FIG. 10, the deep learning algorithm may also be operated on a graphical processing unit, as explained with reference to FIG. 9.

In order to perform a reconstruction which takes into account past data, a prediction model which reconstructs the input based on the current input and past input may be used. Embodiments for these prediction models have already been described (see e.g. FIG. 8).

The method may further comprise a step 102 of comparing the reconstructed data with the exchanged data. The comparison may be performed by the processing unit of the system 10. The comparison may comprise comparing each data that is reconstructed by the system 10 with the corresponding true input. For instance, the reconstruction of Input i (at Output unit i) is compared to the true Input i. This comparison may be performed at each time t, for each data of the exchanged data.

This comparison may be used to build a reconstruction error.

According to some embodiments, the reconstruction error is computed for each data. For instance, a reconstruction error is computed for each Output unit i, by computing the difference between the reconstruction of Input i (i.e., the output of Output unit i) and the true Input i. Other formulas may be used to express the reconstruction error, such as statistical values (e.g., entropy, variance, covariance, etc.).

The reconstruction error may vary with time. Generally, the larger the reconstruction error, the greater the detected anomaly. An anomaly may correspond to the fact that the data do not vary in compliance to what they are supposed to vary (as predicted by the prediction model), such as due to defect or failure of units of the device.

According to some embodiments, a global reconstruction error is computed which reflects the total reconstruction error. For example, the global reconstruction error may comprise the mean squared reconstruction errors computed for each Output i, or a statistical combination of each of the reconstruction errors.

The method may then comprise a step 103 of providing indications on anomalies in the exchanged data. This step 103 may rely on the comparison and on the reconstruction error computed at step 102.

If the prediction model takes into account past data (as explained with reference to FIG. 10), the indications on anomalies in the data are indications which take into account the past exchanged data. In other words, the history of the exchanged data is analyzed to provide indications if an anomaly is present, and not only the current exchanged data.

According to some embodiments, the indications may comprise a probability that an anomaly exists in the data. This probability may be provided by the deep learning algorithm.

According to other embodiments, the indications may comprise a binary value (for instance 1 corresponds to true, and 0 to false) that an anomaly was detected in the data. The binary value may for instance be computed based on a comparison between the probability provided by the deep learning algorithm and a threshold (which may be set by the operator of the system 10).

According to some embodiments, the system 10 may provide that there is an anomaly in the exchanged data when the reconstruction error is above a predetermined value.

According to some embodiments, the system 10 may provide that there is an anomaly in one of the inputs i when the reconstruction error for this input is above a predetermined value.

As an example, in a car, the system 10 perform an analysis of various data exchanged in the car, such as (but not limited to) car speed, temperature, etc. If the car speed follows an abnormal curve with respect to time, or if special peaks are detected, the system 10 may provide an indication that the car speed is abnormal, which may cause security problems.

This applies of course to other units of the car, such as detection of the failure or defect of the motor, etc. These examples are not limitative.

According to some embodiments, the system 10 takes into account the reconstruction error for each Output unit i and the global reconstruction error in order to provide indications on anomalies in the data.

According to some embodiments, the system 10 may provide indications that anomalies exist in data when the reconstruction error of a subset of data is above a predetermined value (i.e., a threshold). For example, in a car, this may comprise indicating that anomalies exist in the motor when its pressure and its temperature do not follow a standard curve. Various other analyses may be performed.

According to some embodiments, the system 10 comprises a notification module (not represented) which may be operable on a processing unit and which may raise an alert if the indications provided by the deep learning algorithm show that an anomaly has been detected in the data. This notification module is not necessarily part of the system 10 and may be located at least partially externally to this system.

Any adapted alert may be raised (such as visual alert, audio alert, remote alert, or software alert sent to another device, etc.)

The invention contemplates a computer program being readable by a computer for executing one or more methods of the invention. The invention further contemplates a machine-readable memory tangibly embodying a program of instructions executable by the machine for executing one or more methods of the invention.

It is to be noted that the various features described in the various embodiments may be combined according to all possible technical combinations.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the invention as hereinbefore described without departing from its scope, defined in and by the appended claims.

The invention claimed is:

1. A method of analyzing data exchange of at least one device, with a system for data exchange analysis, the system for data exchange analysis comprising at least a deep neural network operable on at least a processing unit, wherein the deep neural network comprises at least an input layer, an output layer, and hidden layers, the method comprising:
- feeding data exchanged by the at least one device to the input layer of the deep neural network of the system for data exchange analysis, wherein neurons of the hidden layers receive recurrently, at each time t, only a subset of the data exchanged by the at least one device up to time t, the subset of data comprising a fraction of past data from time $t_{past}$ to time t, with $t_{past} < t$, wherein the output layer is of the same size as the input layer,
- at the output layer, providing reconstructed data corresponding to a prediction, by the deep neural network, of data received at the input layer at time t,
- comparing the reconstructed data with data received at the input layer at time t, to determine a reconstruction error, and
- providing indication on one or more anomalies in the data, based on at least the reconstruction error, thereby facilitating detection of anomalies while taking into account history of data.

2. The method of claim 1, comprising, at each time t, and while the at least one device is being used:
- at the output layer, providing reconstructed data corresponding to a prediction, by the deep neural network, of data received at the input layer at time t, and
- performing both a prediction step and a training step,
- wherein said prediction step comprises comparing the reconstructed data with data received at the input layer at time t, to determine a reconstruction error, and providing indication on one or more anomalies in the data, based on at least the reconstruction error, and
- wherein said training step comprises, based on at least this reconstruction error, updating a model of the deep neural network, for allowing the system for data exchange analysis to detect anomalies in the data of the at least one device.

3. The method of claim 2, wherein data received at the input layer are live data exchanged by the at least one device during its use.

4. The method of claim 1, wherein each of a plurality of neurons of the hidden layers receive recurrently, at each time t, only a subset of the data exchanged by at least one device up to time t, the subset of data comprising past data output by other neurons of an hidden layer at a previous time $t_{past} < t$.

5. The method of claim 1, wherein the processing unit comprises at least a graphical processing unit.

6. The method of claim 1, wherein the at least one device is a car.

7. The method of claim 1, wherein target labels of neurons of the output layer are set to be the same as the data received by neurons of the input layer.

8. A method of training a system for data exchange analysis, the system for data exchange analysis comprising at least a deep neural network operable on at least a processing unit, wherein the deep neural network comprises at least an input layer, an output layer, and hidden layers, the method comprising:
- feeding a training set of data to the input layer of the deep neural network of the system for data exchange analysis,
  - wherein neurons of the hidden layers receive recurrently, at each time t, only a subset of data of the training set of data fed to the system up to time t, the subset of data comprising a fraction of past data from time $t_{past}$ to time t, with $t_{past} < t$,
  - wherein the output layer is of the same size as the input layer,
- at the output layer, providing reconstructed data corresponding to a prediction, by the deep neural network, of data received at the input layer at time t,
- comparing the reconstructed data with data received at the input layer at time t, to determine a reconstruction error, and
- based on at least this reconstruction error, updating a model of the deep neural network, for allowing the system for data exchange analysis to detect one or more anomalies in the data of at least one device based on this model.

9. The method of claim 8, comprising, at each time t, and while the at least one device is being used:
- at the output layer, providing reconstructed data corresponding to a prediction, by the deep neural network, of data received at the input layer at time t, and
- performing both a prediction step and a training step,
- wherein said prediction step comprises comparing the reconstructed data with data received at the input layer at time t, to determine a reconstruction error, and providing indication on one or more anomalies in the data, based on at least the reconstruction error, and
- wherein the training step comprises, based on at least this reconstruction error, updating a model of the deep neural network, for allowing the system for data exchange analysis to detect anomalies in the data of the at least one device.

10. The method of claim 8, wherein data received at the input layer are live data exchanged by the at least one device during its use.

11. The method of claim 8, wherein each of a plurality of neurons of the hidden layers receive recurrently, at each time t, only a subset of data of the training set of data fed to the system up to time t, the subset of data comprising a fraction of past data output by other neurons of an hidden layer at a previous time $t_{past} < t$.

12. The method of claim 8, wherein the processing unit comprises at least a graphical processing unit.

13. The method of claim 8, wherein the at least one device is a car.

14. The method of claim 8, wherein target labels of neurons of the output layer are set to be the same as the data received by neurons of the input layer.

15. A system of analyzing data exchange of at least one device, comprising at least a processing unit and at least a deep neural network operable on the processing unit, wherein the deep neural network comprises at least an input layer, an output layer, and hidden layers, the system being configured to:
- feed data exchanged by the at least one device to the input layer of the deep neural network of the system for data exchange analysis,
  - wherein neurons of the hidden layers receive recurrently, at each time t, only a subset of the data exchanged by the at least one device up to time t, the subset of data comprising a fraction of past data from time $t_{past}$ to time t, with $t_{past} < t$,
  - wherein the output layer is of the same size as the input layer,
- at the output layer, providing reconstructed data corresponding to a prediction, by the deep neural network, of data received at the input layer at time t,
- comparing the reconstructed data with data received at the input layer at time t, to determine a reconstruction error, and provide indication on one or more anomalies in the data, based on at least the reconstruction error, thereby facilitating detection of anomalies while taking into account history of data.

16. The system of claim 15, configured to, at each time t, and while the at least one device is being used:
at the output layer, provide reconstructed data corresponding to a prediction, by the deep neural network, of data received at the input layer at time t, and
perform both a prediction step and a training step,
wherein the prediction step comprises comparing the reconstructed data with data received at the input layer at time t, to determine a reconstruction error and providing indication on one or more anomalies in the data, based on at least the reconstruction error, and
wherein the training step comprises, based on at least this reconstruction error, updating a model of the deep neural network, for allowing the system for data exchange analysis to detect anomalies in the data of the at least one device.

17. The system of claim 15, wherein data received at the input layer are live data exchanged by the at least one device during its use.

18. The system of claim 15, wherein each of a plurality of neurons of the hidden layers receive recurrently, at each time t, only a subset of the data exchanged in at least one device up to time t, the subset of data comprising a fraction of past data output by other neurons of an hidden layer at a previous time $t_{past} < t$.

19. The system of claim 15, wherein the processing unit comprises at least a graphical processing unit.

20. The system of claim 15, wherein the at least one device is a car.

21. The system of claim 15, wherein target labels of neurons of the output layer are set to be the same as the data received by neurons of the input layer.

22. A training module configured to train a system for data exchange analysis, the system for data exchange analysis comprising at least a deep neural network operable on at least a processing unit, wherein the deep neural network comprises at least an input layer, an output layer, and hidden layers, wherein the training module is configured to, by a processing unit:
feed a training set of data to the input layer of the deep neural network of the system for data exchange analysis,
wherein neurons of the hidden layers receive recurrently, at time t, only a subset of the data exchanged by the at least one device up to time t, the subset of data comprising a fraction of past data from time $t_{past}$ to time t, with $t_{past} < t$,
wherein the output layer is of the same size as the input layer,
cause the system for data exchange analysis to:
at the output layer, provide reconstructed data corresponding to a prediction, by the deep neural network, of data received at the input layer at time t,
compare the reconstructed data with data received at the input layer at time t, to determine a reconstruction error, and
provide indication on one or more anomalies in the data, based on at least the reconstruction error, thereby facilitating detection of anomalies while taking into account history of data.

23. The training module of claim 22, wherein each of a plurality of neurons of the hidden layers receive recurrently, at each time t, only a subset of the data exchanged by at least one device up to time t, the subset of data comprising a fraction of past data output by other neurons of an hidden layer at a previous time $t_{past} < t$.

24. The training module of claim 22, wherein the processing unit comprises at least a graphical processing unit.

25. The training module of claim 22, wherein the at least one device is a car.

26. The training module of claim 22, wherein target labels of neurons of the output layer are set to be the same as the data received by neurons of the input layer.

27. A non-transitory storage device readable by a machine, tangibly embodying a program of instructions executable by the machine to perform a method of analyzing data exchange of at least one device, with a system for data exchange analysis, the system for data exchange analysis comprising at least a deep neural network operable on at least a processing unit, the deep neural network comprising an input layer, hidden layers, and an output layer, the method comprising:
feeding data exchanged by the at least one device to the input layer of the deep neural network of the system for data exchange analysis,
wherein neurons of the hidden layers receive recurrently, at each time t, only a subset of the data exchanged by the at least one device up to time t, the subset of data comprising a fraction of past data from time $t_{past}$ to time t, with $t_{past} < t$,
wherein the output layer is of the same size as the input layer,
at the output layer, providing reconstructed data corresponding to a prediction, by the deep neural network, of data received at the input layer at time t,
comparing the reconstructed data with data received at the input layer at time t, to determine a reconstruction error, and
providing indication on one or more anomalies in the data, based on at least the reconstruction error, thereby facilitating detection of anomalies while taking into account history of data.

28. A non-transitory storage device readable by a machine, tangibly embodying a program of instructions executable by the machine to perform a method of training a system for data exchange analysis, the system for data exchange analysis comprising at least a deep neural network operable on at least a processing unit, wherein the deep neural network comprises at least an input layer, an output layer, and hidden layers, the method comprising:
feeding a training set of data to the input layer of the deep neural network of the system for data exchange analysis,
wherein neurons of the hidden layers receive recurrently, at each time t, only a subset of data of the training set of data fed to the system up to time t, the subset of data comprising a fraction of past data from time $t_{past}$ to time t, with $t_{past} < t$,
wherein the output layer is of the same size as the input layer,
at the output layer, providing reconstructed data corresponding to a prediction, by the deep neural network, of data received at the input layer at time t,
based on at least this reconstruction error, updating a model of the deep neural network, for allowing the system for data exchange analysis to detect one or more anomalies in the data of the at least one device based on this model.

* * * * *